Figure 1:
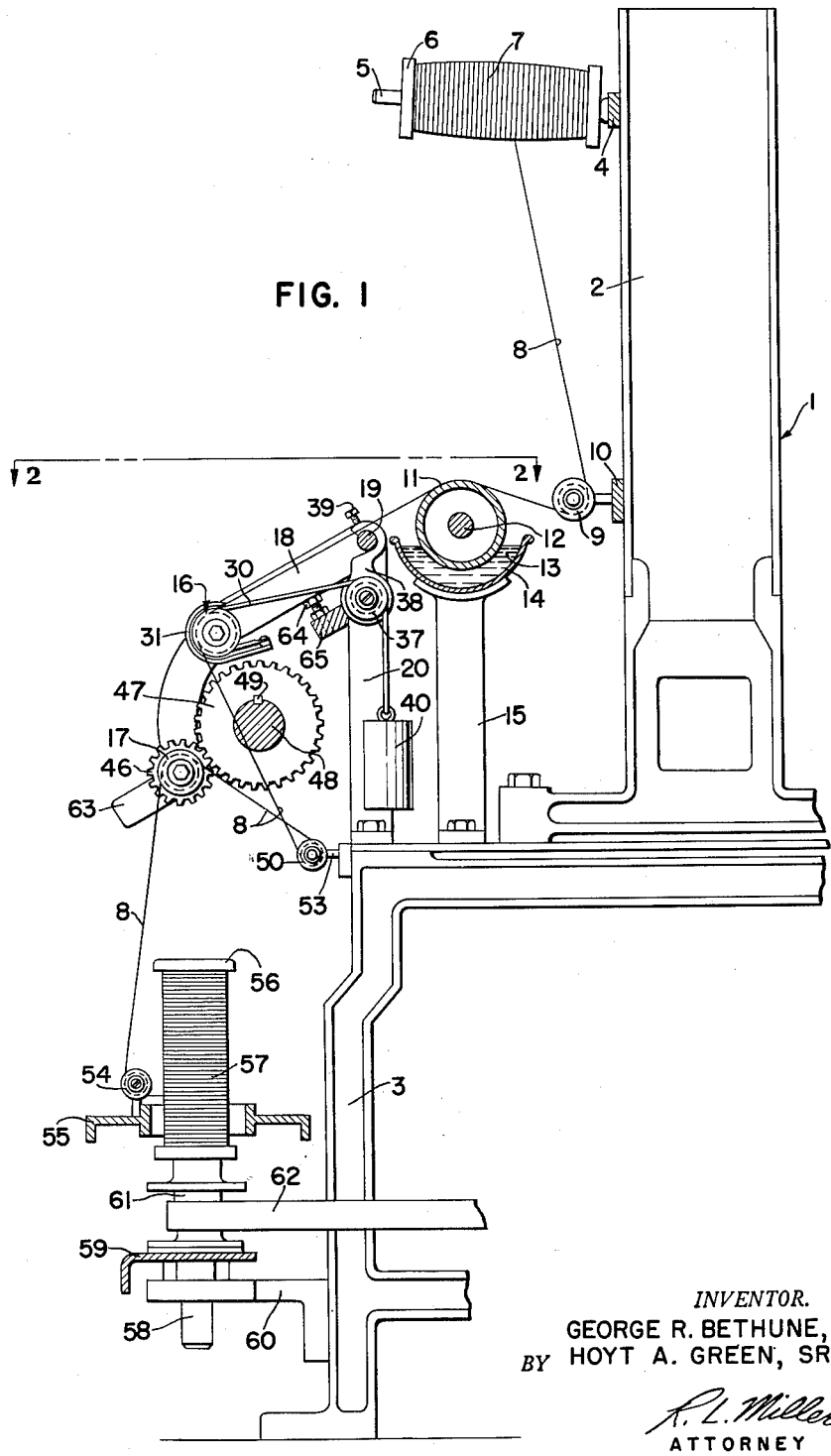

June 29, 1954 G. R. BETHUNE, JR., ET AL 2,682,096
CORD ELONGATION EQUALIZING APPARATUS
Filed Dec. 9, 1950 2 Sheets-Sheet 1

INVENTOR.
GEORGE R. BETHUNE, JR.
HOYT A. GREEN, SR.
BY
*R. L. Miller*
ATTORNEY

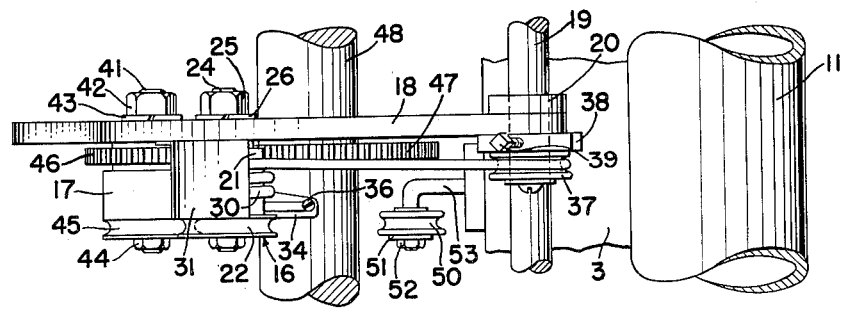
FIG. 2
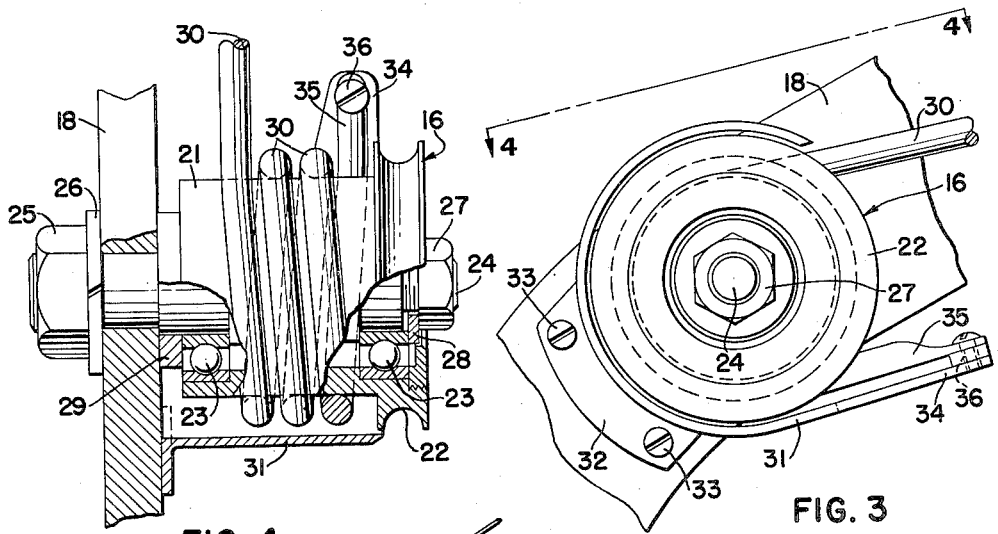
FIG. 4
FIG. 3
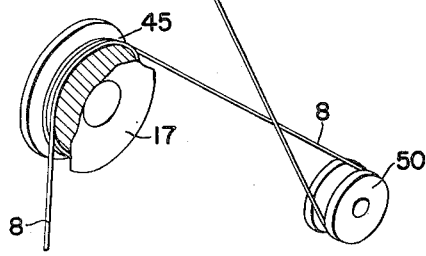
FIG. 5
INVENTOR.
GEORGE R. BETHUNE, JR.
BY HOYT A. GREEN, SR.
ATTORNEY Patented June 29, 1954

2,682,096

UNITED STATES PATENT OFFICE 2,682,096

CORD ELONGATION EQUALIZING APPARATUS

George R. Bethune, Jr., Atco, and Hoyt A. Green, Sr., Cartersville, Ga., assignors, by mesne assignments, to The Goodyear Tire & Rubber Company, a corporation of Ohio Application Dec. 9, 1950, Serial No. 199,956

6 Claims. (Cl. 28—71.3)

The present invention relates to a novel form of apparatus for the equalization of the elongation of cords, threads, and the like hereinafter referred to simply as "cords." More particularly, the instant invention pertains to a form of cord manipulating means which operates automatically to compensate for variations in the elongation of unstretched cords, whereby the several finished treated and stretched cords processed upon the apparatus will possess greater uniformity in their elongation characteristics.

Thus, it is one of the primary objects of the instant invention to provide an apparatus which will advantageously reduce and equalize the elongation characteristics of a multiplicity of cords.

It is another object of the present invention to provide a machine which will automatically compensate for any variation in elongation as between each of a large number of cord samples and will produce the desired uniformity as between the finished cords.

The apparatus of the invention embodies, in addition to other essential elements, a pair of rotatable members, one of which is positively driven, while the other is freely rotatably mounted. A portion of the cord is snubbed about each of the rotatable members and the freely rotatably mounted member is retarded or braked to regulate the degree of stretch produced in the cord in the course of its manipulation between the rotatable members.

Thus, in accordance with the teachings of the present invention, an unstretched cord with higher than average elongation will cause the freely rotatable member to be automatically slowed down with respect to the driven member through the action of the braking element, thereby increasing the degree of stretching of the cord being manipulated. Conversely, an unstretched cord possessing a lower than average elongation will cause the speed of rotation of the freely rotatable member to be automatically adjusted to more nearly correspond with that of the driven member, whereby the degree of stretching of the cord will be diminished. The resultant cords produced in accordance with either operation will possess greater uniformity in their elongation characteristics.

Other objects and advantages of the apparatus of the present invention will become apparent as a detailed description of one form of such apparatus proceeds.

Fig. 1 represents a vertical cross-section with parts removed and broken away illustrating a typical form of cord manipulating apparatus with which the teachings of the present invention are particularly well adapted to be employed. Fig. 2 is a fragmentary plan view at an enlarged scale of the apparatus of Fig. 1 as seen from the line 2—2 therein. Fig. 3 is an enlarged fragmentary elevation of the retarding or braking element of the apparatus. Fig. 4 is a view of the braking element of Fig. 3 as seen from the line 4—4 therein with parts in section and broken away. Fig. 5 is a schematic representation of the cord path through the apparatus.

In Fig. 1 of the drawings, the cord manipulating apparatus 1 is identified generally by the reference numeral 1. The cord manipulating apparatus 1 comprises a plurality of identical positions or units arranged in spaced parallel relation extending longitudinally of the apparatus which embodies a number of spaced upright creel frames 2 supported upon the base portions 3. Adjacent the uppermost end of the creel frame 2 is disposed a substantially horizontally disposed bar 4 extending lengthwise of the apparatus and supporting a number of pins 5 on each of which is positioned a spool 6 bearing a supply package 7 of unstretched cord 8.

An end of the cord 8 is withdrawn from the package 7 contained on the spool 6 and is passed under a roller guide 9 rotatably mounted on the longitudinally extending support member 10 secured to the upright creel frame 2. From the guide 9 the cord 8 is passed over and in contact with the periphery of a scotch roll 11 mounted for rotation upon a longitudinally extending shaft 12 and arranged with a portion of its surface immersed in a supply 13 of a suitable dip or treating solution contained in the tank 14 extending longitudinally of the cord manipulating apparatus 1. The tank 14 is supported in the cord manipulating apparatus 1 as by means of a plurality of spaced vertical supports 15 which are mounted upon each of the base portions 3.

After leaving the scotch roll 11, the cord 8 is wound several times about the first of a pair of rotatable members or rolls 16, 17 mounted upon the swingably mounted arm 18. The rolls 16 and 17 advantageously take the form of pulleys in the grooved portions of which the cord 8 is wound several times so as to produce a positive snubbing action over a rather extensive portion of the cord in a manner to be explained more fully hereinafter. The swingably mounted arm 18 is supported upon the longitudinally extending rod 19 which extends in a generally horizontal plane lengthwise of the cord manipulating apparatus 1 and is suspended in the vertical supports 20 arranged in spaced relation along the machine and secured to each of the base portions 3 thereof.

The roll 16 is freely rotatably mounted upon the arm 18 in the manner more fully illustrated in Figs. 2, 3, and 4 of the drawings. The portion 21 of the roll 16 conveniently takes the form of a cylinder having an integrally formed grooved portion 22 adjacent the free end thereof. The cylindrical portion 21 is provided with a pair of internally disposed spaced roller bearings 23 which are mounted upon a stud 24 secured to the arm 18 as by means of the nut 25 and the washer 26. The outermost end of the stud 24 is threaded to receive the nut 27 which bears against the washer 28 and serves to hold the roll 16 with its cylindrical portion 21 in position against the spacer 29 adjacent the arm 18 at the supported end of the cylinder.

While the roll 16 is freely rotatably mounted, it is necessary to control, within predetermined limits, the speed of rotation of the roll so as to produce the desired tension in the cord between rolls 16 and 17 in order to obtain finished cords having substantially identical elongation characteristics. To achieve this result, the roll 16 is provided with a braking element which takes the form of a leather belt 30 wrapped spirally about the cylindrical portion 21 of the roll. A suitable cover 31 encloses the belt 30 and serves to prevent the cord 8 from becoming entangled with the belt in the event that the cord slips out of the groove 22. A flange portion 32 on the cover 31 affords a means for mounting the latter on the arm 18 through the aid of the machine screws 33 threaded thereinto.

The cover 31 is formed with a projecting portion 34 to which one end 35 of the belt 30 is secured by means of the machine screw 36 threaded into the projecting portion. The opposite end of the belt 30 is passed over a spool or pulley 37 freely rotatably mounted on the bracket or hanger 38 which is secured in depending relation to the longitudinally extending rod 19 by means of the set screw 39. The free end of the belt 30 is secured to the weight 40 which is of sufficient size to produce a predetermined degree of retardation on freedom of rotation of the cylindrical portion 21 of the roll 16.

The roll 17 is mounted in a manner generally similar to the roll 16. A stud 41 is mounted on the arm 18 and secured thereto by means of a nut 42 and washer 43. The roll 17 is provided with internally disposed bearings (not shown) and is held in place on the stud 41 by the nut 44 on the outermost end thereof. Like the roll 16, the roll 17 has a grooved portion 45 for the reception of a number of turns of the cord 8 to afford the desired snubbing effect thereon.

The roll 17 is adapted to be positively driven to insure the travel of the cord 8 through the manipulative stages in its treatment. To this end, a gear 46 is mounted on the stud 41 and is secured to the roll 17. A drive gear 47 meshes with the gear 46 of the roll 17 and is driven by the longitudinally extending drive shaft 48 journaled at spaced intervals lengthwise of the cord manipulating apparatus 1. The drive gear 47 is secured in driving relation to the drive shaft 48 by the key 49.

As the cord 8 is threaded about the rolls 16 and 17, a portion thereof is passed around a pulley 50 disposed in the path of the cord intermediate the two rolls when the apparatus is threaded up. The pulley 50 is held in place by means of a washer 51 backed by the nut 52 threaded on the end of the support 53. This feature of the pulley 50 is highly important since it provides a somewhat longer cord path between the rolls 16 and 17 which is subjected to stretch and it serves to insure against inadvertent upswinging of the arm 18 causing disengagement of the gears 46 and 47.

From the roll 17, the cord 8 is passed under the guide spool 54 secured to the reciprocating ring rail 55 and operates to lay the cord 8 on the spool 56 in the form of a package 57. The stationary spindle 58 extends vertically with respect to the fixed rail 59 which is supported in horizontal position by the brackets 60 so as to extend lengthwise of the cord manipulating apparatus 1. The spool 56 is supported and rotated by means of the bolster 61 which is driven by the tape or belt 62 actuated by a conventional drive means (not shown).

Fig. 5 illustrates clearly the path followed by the cord 8 when each station of the cord manipulating apparatus 1 is completely threaded up. The cord 8 is snubbed about the grooved portions 22 and 45 of the rolls 16 and 17 to insure against the possibility of slippage of the cord when tension is applied thereto. Only a partial wrap or single turn of the cord 8 is made about the intermediate pulley 50.

The arm 18 has a handle portion 63 thereon to provide a means for the operator to grasp in engaging and disengaging the gear 46 with respect to the drive gear 47 as the cord manipulating apparatus 1 is threaded up and its operation started. A suitable adjusting means such, for example, as the bolt 64 adjustably threaded into the bar 65 is provided on the cord manipulating apparatus 1 to support the arm 18 with the gears 46 and 47 in their proper meshing relation when they are engaged.

As previously stated, the cord manipulating apparatus 1 embodying the features of the present invention operates automatically to process a multiplicity of cords having a comparatively wide variance in their elongation characteristics. The cords, after processing in the apparatus, show a much reduced variation in elongation and slightly improved tensile properties. The improved tensile is highly desirable, but represents only a by-product of the process.

The principle of operation of the apparatus of the invention is best understood from a description of what takes place for each type of cord processed. It should be understood at the outset that the speed of rotation of the roll 17, which is being positively driven, is constant throughout the entire cord processing apparatus 1 by reason of the common drive shaft 48 and the fact that the gears 46 and 47 are identical for each position on the machine. Moreover, the weights 40 secured to the braking element 30 are uniform and chosen to produce a predetermined elongation. It will be understood that the heavier the weight, the lower will be the resultant elongation of the cord.

With a braking friction being applied to the cylindrical portion 21 of the freely rotatably mounted roll 16 by the braking element 30, the roll 16 will only rotate as fast as is necessary to constantly maintain the predetermined tension in the cord 8 between the rolls 16 and 17. The inherent variation in the elongation of the unstretched cord 8 is thus reduced to a minimum because of the fact that, as indicated above, the speed of the driven roll 17 is constant while the speed of the braked roll 16 varies depending upon the elongation characteristics of the unstretched cord.

Thus, a cord with higher than average elongation will cause the brake roll 16 to slow down automatically and immediately since the cord tends to stretch more under the predetermined tension imparted by the driven roll 17 and the braking effect of the braking element on the roll 16 is not as readily overcome. The roll 16 is thus caused to rotate more slowly than the driven roll 17. When a cord with lower than average elongation is processed in one of the adjacent positions on the cord processing apparatus 1, the roll 16 will be rotated at a speed more nearly approaching that of the driven roll 17 with the result that the amount of stretch imparted will be much less than in the previous example. The amount of stretching in either case will be in proportion to the elongation characteristics of the original unstretched cords.

While certain representative embodiments and details have been shown for the purpose of illustrating the invention, it will be apparent to those skilled in this art that various changes and modifications may be made therein without departing from the spirit or scope of the invention.

We claim:

1. Apparatus for the reduction and equalization of the elongation of cord comprising means supplying a cord to be treated; a roll about which the cord is snubbed; means supporting the roll in freely rotatable relation; means for retarding the free rotation of the roll; a driven member about which the cord is snubbed after it has left the roll; means for actuating the driven member; means for disengaging the driven member from the actuating means; fixed means about which the cord passes intermediate the roll and the driven member for preventing inadvertent disengagement of the driven member and actuating means; and means to which the cord is directed from the driven member for winding it in the form of a package.

2. Apparatus for the reduction and equalization of the elongation of cord comprising a supply package of cord to be treated; a pair of grooved rolls about each of which a portion of the cord is wound in a plurality of turns, one of said rolls being positively driven, while the other is freely rotatable; means for actuating the driven roll; for disengaging the driven member from the actuating means; means for resisting the free rotation of the rotatable roll; a fixed guide pulley about which the cord is passed at a point in its path intermediate the rolls for preventing inadvertent disengagement of the driven member from the actuating means; and means to which the cord is directed from the driven roll for winding it in the form of a package.

3. Apparatus for the reduction and equalization of the elongation of cord comprising a supply package of cord to be treated; a pair of grooved rolls about each of which a portion of the cord is wound in a plurality of turns, one of said rolls being positively driven, while the other is freely rotatable; gearing for actuating the driven roll; a braking element on the rotatable roll for resisting its free rotation; means swingably supporting the rolls; a fixed guide pulley about which the cord is passed at a point in its path intermediate the rolls for preventing inadvertent disengagement of the driven member from the actuating means; and means to which the cord is directed from the driven roll for winding it in the form of a package.

4. Apparatus for the reduction and equalization of the elongation of cord comprising a supply package of cord to be treated; a first grooved roll mounted in freely rotatable relation about which a portion of the cord is wound in a plurality of turns; a braking element associated with the first roll to retard its freedom of rotation; a second grooved roll about which a portion of the cord is wound in a plurality of turns; means swingably supporting the rolls; driving means on the second roll; fixed means about which the cord is directed after leaving the first roll whereby inadvertent disengagement of the driven member from the actuating means is prevented; means for actuating the driving means; and a device for collecting the cord in the form of a package.

5. Apparatus for the reduction and equalization of the elongation of cord comprising a supply package of cord to be treated; a pair of grooved rolls about each of which a portion of the cord from the supply package is wound in a plurality of turns, one of said rolls being freely rotatably mounted, while the other is adapted to be positively driven; means swingably supporting the rolls; gearing for actuating the driven roll; a braking element for frictional engagement with the freely rotatably mounted roll to retard its freedom of rotation; a fixed guide around which the cord is passed after it traverses the freely rotatably mounted roll and before it is directed to the driven roll for preventing inadvertent disengagement of the driven member from the actuating means; and a device for collecting the cord as it is discharged from the driven roll in the form of a package.

6. Apparatus for stretching cord to reduce and equalize the elongation thereof comprising a supply package of the cord to be processed; a pivotable support; a grooved roll freely rotatably mounted on said support to receive a plurality of turns of the cord to be treated from the supply package; a driven grooved roll mounted on said support and about which a plurality of turns of the cord are wound after it has been discharged from the guide; gearing for actuating the driven roll; a fixed guide for receiving the cord from the freely rotatable roll and before it is directed to the driven roll whereby inadvertent disengagement of the driven member from the actuating means is prevented; a braking element for frictionally engaging the freely rotatably mounted roll and limiting its freedom of rotation; and a device for collecting the treated cord in the form of a package.

References Cited in the file of this patent

UNITED STATES PATENTS

| Number | Name | Date |
| --- | --- | --- |
| 2,037,506 | Ensinger | Apr. 14, 1936 |
| 2,123,936 | Dreyfus | July 19, 1938 |
| 2,172,497 | Cadden | Sept. 12, 1939 |
| 2,271,854 | Clarkson | Feb. 3, 1942 |
| 2,464,536 | Solliday | Mar. 15, 1949 |
| 2,499,888 | Taylor | Mar. 7, 1950 |